United States Patent [19]

Wallace et al.

[11] 4,422,240
[45] Dec. 27, 1983

[54] CUTTING IMPLEMENTS

[75] Inventors: Edward M. Wallace, Longmeadow; Robert G. Gosselin, Springfield; Ernest D. Labarre, Holyoke, all of Mass.

[73] Assignee: Wallace Mgf. Corp., Enfield, Conn.

[21] Appl. No.: 359,244

[22] Filed: Mar. 18, 1982

[51] Int. Cl.³ .............................................. B26B 13/06
[52] U.S. Cl. ......................................... 30/254; 30/357
[58] Field of Search ................ 30/254, 250, 259, 262, 30/341, 357

[56] References Cited

U.S. PATENT DOCUMENTS

| 1,590,075 | 6/1926 | Brenner | 30/254 |
| 2,090,228 | 8/1937 | Porter | 30/357 X |
| 2,958,944 | 11/1960 | Wertepny | 30/262 |
| 4,150,484 | 4/1979 | Hildebrandt | 30/254 |

FOREIGN PATENT DOCUMENTS 958819  5/1964  United Kingdom ................. 30/254

Primary Examiner—Jimmy C. Peters
Attorney, Agent, or Firm—Ross, Ross & Flavin

[57] ABSTRACT

A shear has a first elongate blade having a generally convex work-engaging-cutting-edge and an elongate handle portion and a second elongate blade having a generally convex work-engaging-cutting-edge and an elongate handle portion and a pivot means for pivotally linking together the first and second blades. In closing stroke, the blades are swingable toward each other and their cutting edges oppose each other in facing relationship with the defined included angle between the blades at any point of their intersection having certain value in the order of 17°±3°. The combined included angles of the bevels of the cutting edges of the blades is in the order of not less than 80° and not more than 120°.

9 Claims, 5 Drawing Figures

CUTTING IMPLEMENTS

This invention relates to improvements in shearing tools such as shears, scissors, tin snips, secateurs, and other hand tools and will be described with particular reference to hedge shears. It is to be understood however that the principles herein exemplified may be applied with equal ease to scissors and other types of hand-manipulated instruments.

The invention envisions cutting implements in which, in the cutting action, the edges of two cooperating blades, in substantial contact with each other, move toward and then past each other as facilitated by a pivot about which the blades rotate. The novelty lies in the fact that the operating edges of the blades are of arcuate configuration so that the cutting action is constant from the initiation to termination of the cutting stroke, a feature aided and abetted both by the particular arcuate configuration of the opposing cutting edges of the blades and by a novel dimensioning of the included angle between the cutting edges.

With known prior art shears, particularly hedge shears, there is the aggravating tendency to push or extrude the work along the relative to the cutting edges as the cutting or closing action ensues. Such extrusion is in the form of a sliding of the work along and relative to the cutting edges with the result that a portion of the cutting action is obviously wasted.

Any conventional shear, particularly a hedge shear, will exhibit, to some degree, this tendency to extrude. As the cutting stroke ensues, the work is pushed away from the apex of the blades and along the blade edges until some point therealong is reached where that sliding action, having slowed down, is finally stopped, whereupon the critical cutting action in the form of the biting of the blades into the work finally commences. This is seriously disadvantageous as the obvious desideratum is to obtain not only an optimum cutting action in the area of the greatest force (that is, in the area nearest the pivot where such action should be initiated) but also a constant and continuous cutting action throughout the cutting stroke.

To overcome this notorious tendency to extrude, serrated blades have been employed, as have notched blades, either approach constituting an express recognition of the extruding problem. The serrating of a single blade is shown in U.S. Pat. No. 3,650,028 to LaPointe, and of both blades is shown in U.S. Pat. No. 2,191,236 to McDonald. The notching of a blade is shown in U.S. Pat. No. 1,890,355 to Bailey.

The use of serrations represents a sacrifice of one or both of the blades as far as efficient cutting action is concerned. The conventional notch, while it may be helpful in cutting heavy growth, is actually a drawback when the shear is used to cut light growths, such as grass and the like, due to the limitations in the shearing action.

We have arrived at a solution which provides a constant shearing action from the commencement to termination of the cutting stroke and defined by the provision of an included angle between the blades in the cutting stroke which is not so small as to jeopardize the shearing efficiency and is yet not so large as to encourage extrusion. The solution represents a striking of an optimum balance between shearing action and extruding tendency.

In prior art shears, the blades, in fully-opened position, may be generally disposed so as to define an included angle approximately 90° or even more, sometimes even as much as an included angle of 125°–130°, relative to each other. Then, in the closing stroke, they may be moved in relative positions so that, immediately prior to full closure, the blades at their outermost points, will have assumed, as to each other, an included angle approximating 10°–12°. With the conventional shear, obviously, the smaller included angle is found near the outboard extreme and the larger angle is found near the inboard extreme of the cutting stroke.

Our primary object of providing an improved cutting action is accomplished with a shear distinguished by a pair of opposed pivotally-mounted blades, each having a specific arcuate curvature along its cutting edge. The cutting blades are each curved toward the other; that is, the blades have convexly curved edges, the convexity being toward each other.

In the case of the shear of this invention, the included angle defined between the cutting edges of the blades during the cutting stroke is a relatively constant one and significantly is maintained at approximately 17°±3°.

That angle can be a constant one in the order of 17° throughout the cutting stroke, or 16°, or 18° or something else as allowed by the limitations of the tolerance. Or the angle can be an ever increasing one, say from 14° or 15° in the pivotal or inboard area to say from 19° or 20° in the outboard area immediately preceding full blade closure. Or the angle can be an ever decreasing one, say from 18° or 19° in the inboard area to say from 15° or 16° in the outboard area. The salient critical feature is that the included angle is a relatively constant one approximating 17°±3°.

In our developmental work, it was recognized that while to increase the included angle was to increase the cutting efficiency. This was so only up to a point; such angle increase also offered the disadvantage that it led to an extruding of the material when and if a certain value of included angle was reached in the absence of course of the aforementioned serrating or notching feature.

The significant discovery was made that optimum cutting efficiency as well as work retention capability are obtainable when and if, in the cutting stroke, the included angle is maintained within the all-critical range of 17°±3° with that angle remaining constant or at least changing only gradually between the point where the cutting edges first contact each other, at stroke initiation, to the point close to stroke termination.

Should that defined included angle fall below 14°, shearing performance was seen to deteriorate rapidly; if extended above 20°, the tendency to extrude was seen to accelerate.

The blades, at all relative positions, are desirably in contact at the point-contact intersection of their cutting edges so as to define an included angle which is never less than 14° or more than 20°.

Additional to the desirability for an arcuate curvature in the cutting edge of each of the blades from pivot to outer extremity and wherein the included angle defined therebetween as the cutting stroke ensues is held within certain limits, our investigative work led us to the further discovery that optimum results are obtained when the total included angle defined by the two opposed cutting edges is desirably between 80° and 120°.

If the total included angle is less than 80°, the edges tend to self distruct. If it exceeds 120°, the slippage feature is disadvantageously accelerated.

In summary, the scissor-like device may be said to consist of a pair of pivotally-secured blades and a pair of handles with a pivotal connection providing a pivot axis for interconnecting the blades and handles so that the movement of the handles in closing stroke toward and in opening stroke away from each other generates a corresponding movement of the blades in facial engagement with each other such that the size of the work-receiving space is reduced and increased respectively, same being singularized by the work engaging edges of the blades each being of arcuate configuration and of course disposed in opposed facing relationship. In the closing stroke, they offer a work-receiving-opening defining a relatively constant included angle having a value of 17°±3°. The cutting edge of one blade will have a combustion holding edge and blunt edge, which preferentially will be in the range of 60° and the cutting edge of the other blade will preferentially be in the range of 45°.

A certain embodiment of shear, in accordance with the invention, will now be described, by way of example, with reference to the accompanying drawings, in which.

Figure 1:
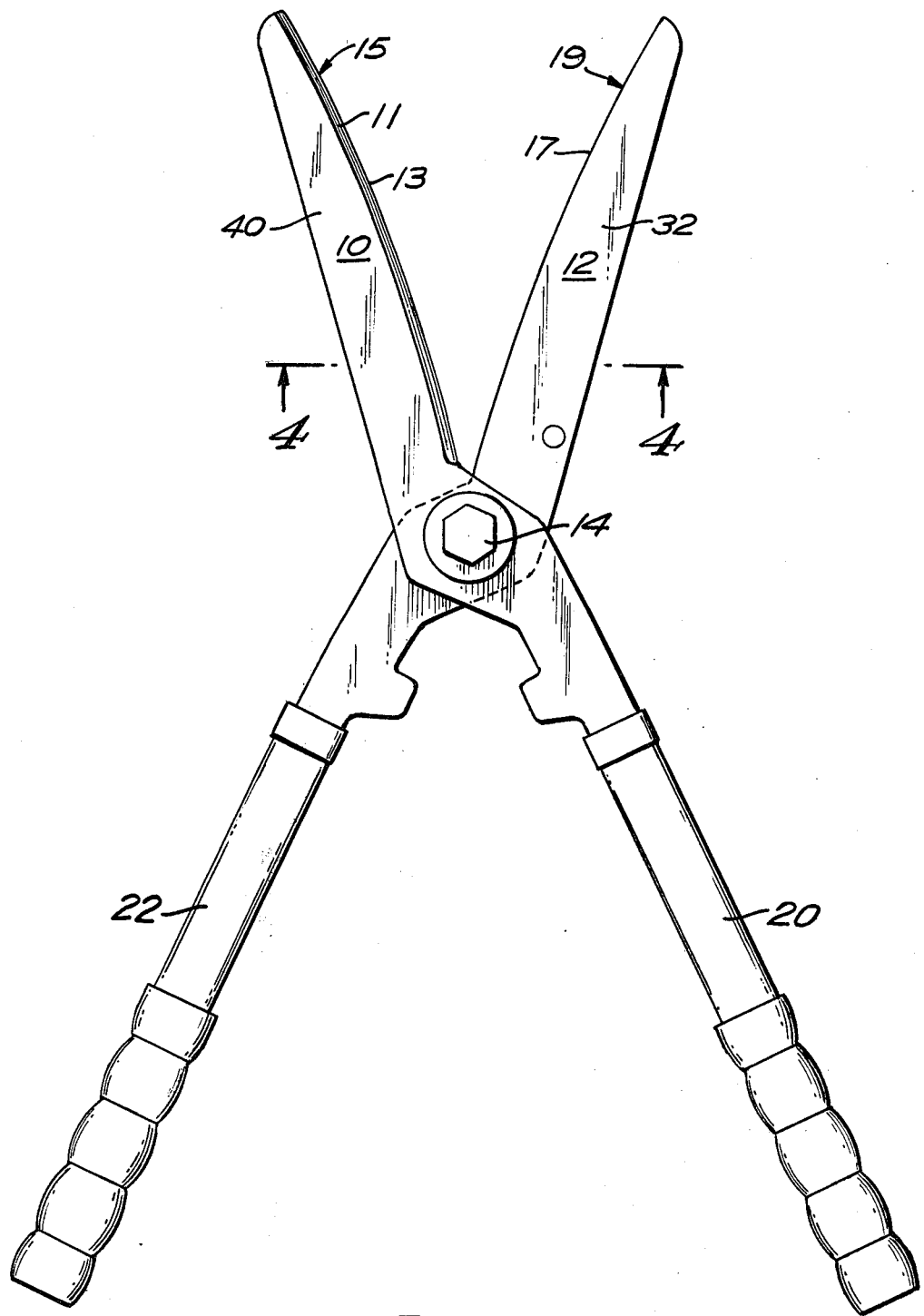
FIGS. 1-3 are views in top plan of a hedge shear of the invention in an opened, partially closed, and nearly fully closed positions respectively.
Figure 2:
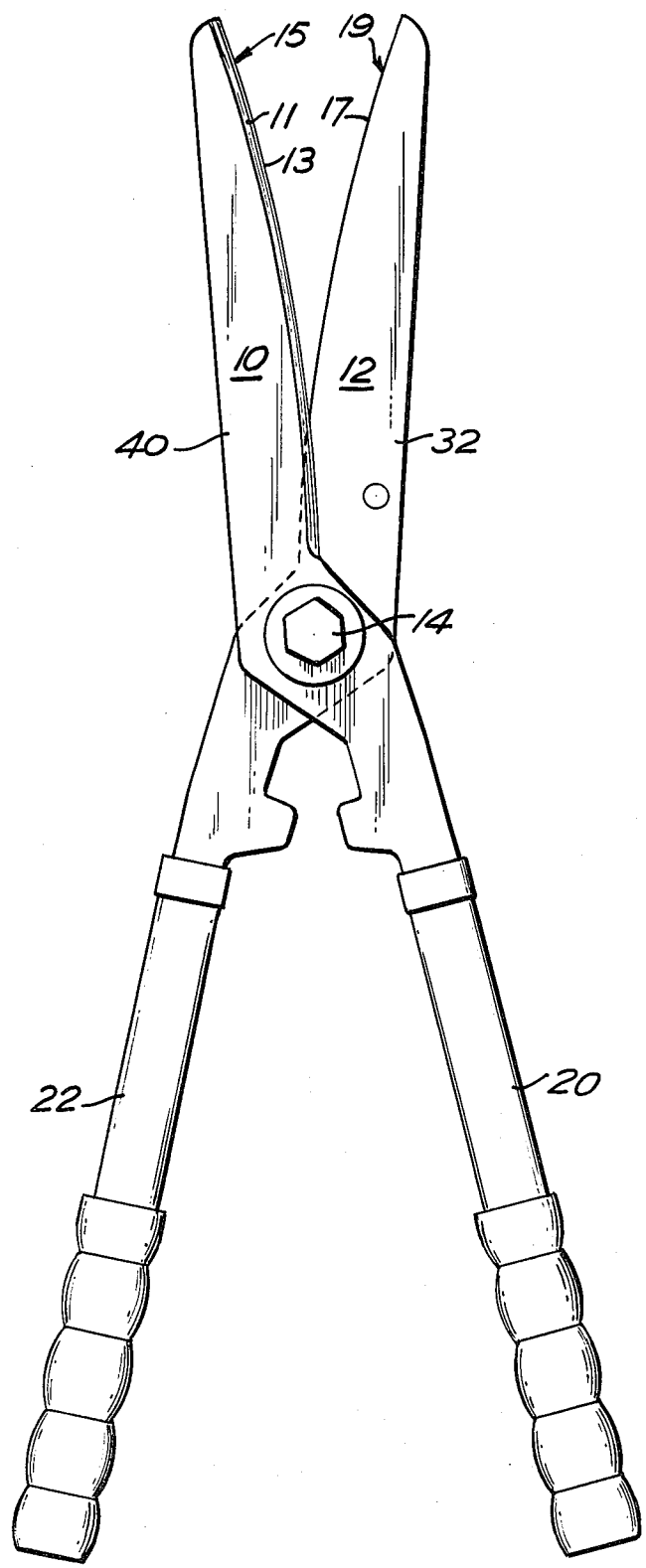
Figure 3:
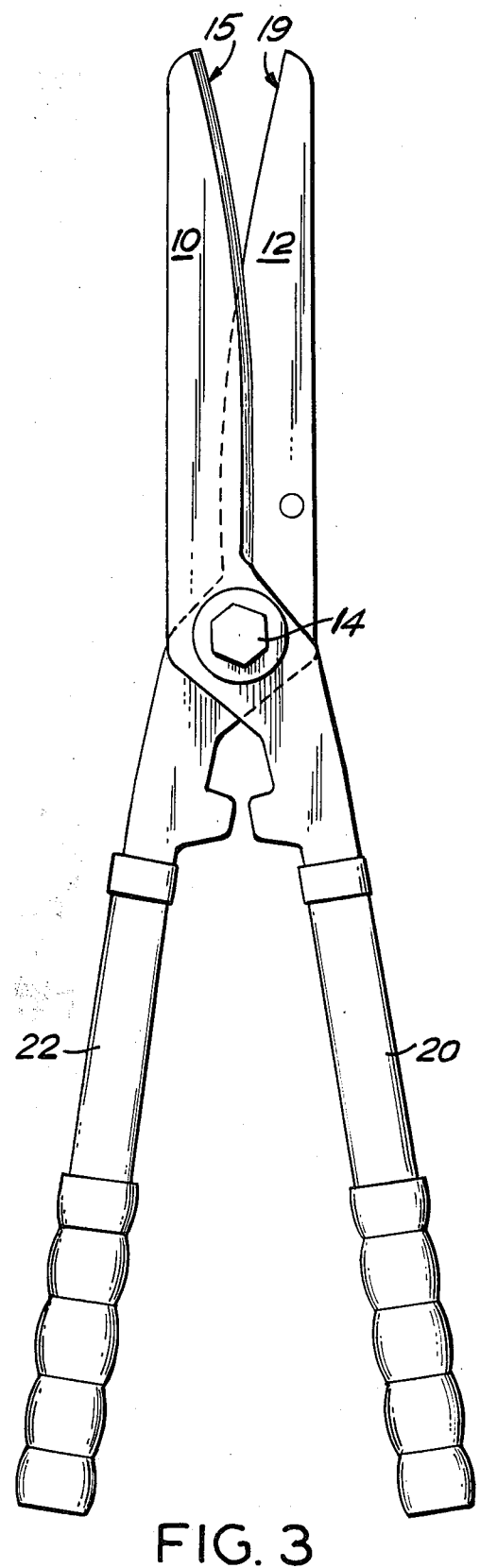
Figure 4:
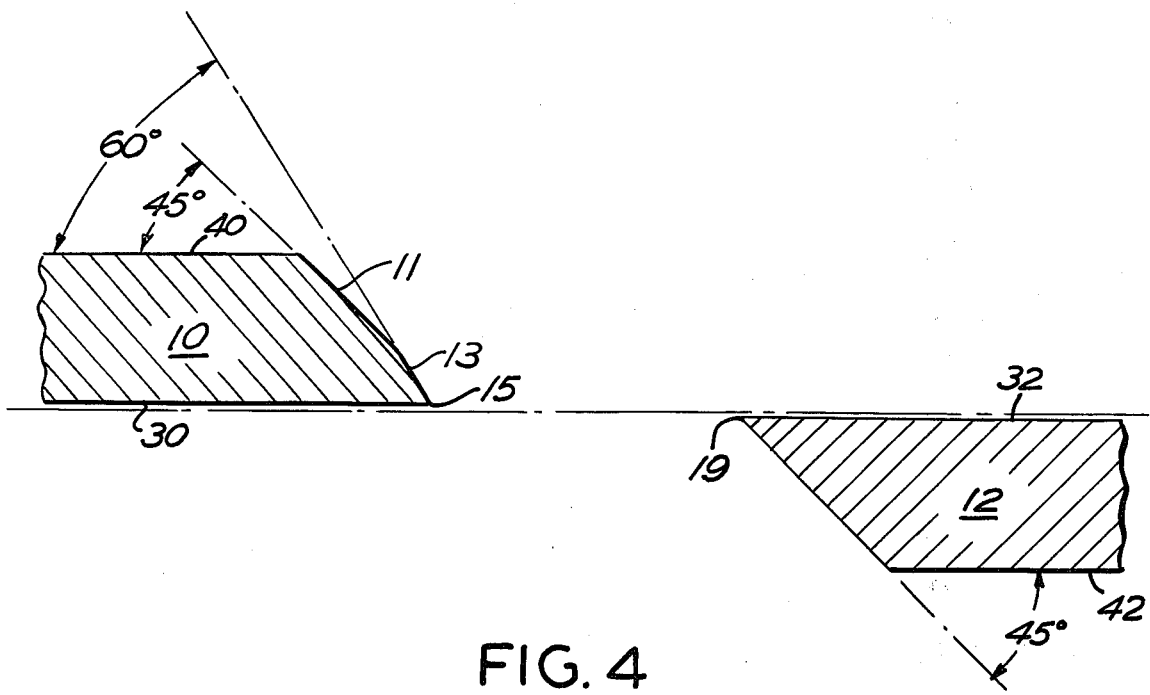
FIG. 4 is an exaggerated sectional view on the line 4—4 of FIG. 1.

The shear includes an upper blade 10 and a lower blade 12 disposed in the usual criss-cross relation and pivotally interconnected by a pivot bolt 14 or other suitable fastening device, extended, in known manner, at their point of intersection through strategically-located, vertically-aligned blade apertures.

A nut (not shown) may be threadedly engaged with the outboard or lower end of the pivot bolt and a spring washer of dished form may be sleeved on the pivot bolt to provide a desired permanent force between the blades. Alternative pivotal means are conceivable.

The blades have suitable handle portions 20 and 22 for grasping the shear and swinging the respective blades 10 and 12 about the pivot means 14 in the cutting function.

The blades 10 and 12 will have confrontable inner faces 30 and 32 respectively and oppositely facing outer faces 40 and 42 respectively.

The inner faces 30 and 32 upon assembly will be disposed in generally the same plane so that they will slide in facial engagement when the blades are swung about the pivot means.

The desired arcuate configuration of the blade cutting is generated mathematically so as to allow the definition, cooperantly with the identical arcuate configuration of the edge of the complemental blade, of an included angle in the order of 17°±3° at any point of intersection of the opposed blades when pivotally inter-related.

The upper and lower blades have generally-convex work-engaging cutting edges 15 and 19 respectively, which edges oppose each other in facing relationship.

Figure 5:
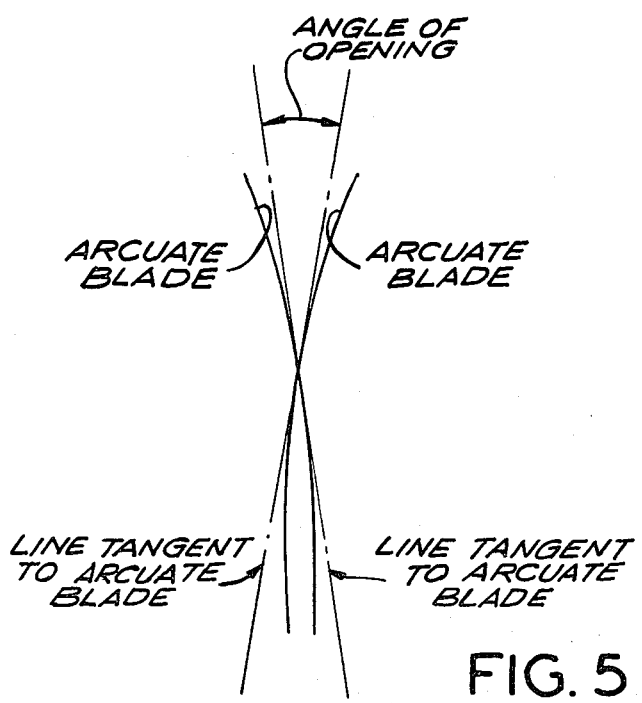
FIG. 5 is a schematic representation showing the arcuate curvature of the cutting edges of the blades and the relationship thereof to lines tangent to the respective lines of curvature.

In FIG. 5, we have shown a schematic representation illustrating the arcuate curvature of the cutting edges of the upper and lower blades and the relationship thereof to respective lines x—x tangent to the respective lines of curvature. When assembled, the cutting edges are so disposed that the tangent lines thereof bisect each other and are generally normal to an imaginary line subtending the convex edges of the blades adjacent the pivotally-linked blades.

The work engaging edges in the closing stroke define an opening having an included angle of the value of 17°±3°.

Upper blade 10 will be provided with a first beveled so-called "blunt" surface 11 disposed at an angle of 45° relative to its outer face 40 and with a second beveled so-called "holding" surface 13 disposed at an angle of 60° relative to its outer face 40 in the defining of what is known as the cutting edge 15 of the upper blade.

Lower blade 12 is provided with a beveled so-called "cutting" surface 17 disposed at an angle of 45° relative to its outer face 42 in the defining of what is known as the cutting edge 19 of the lower blade.

The beveled surfaces extend over the major or shearing portion of the blade lengths and across the blade thicknesses from their outer faces to their inner faces.

Judicious experimentation showed that the totality of the bevels in the case of the confronting cutting edges should not be less than 80° in value or more than 120° in value.

In the exemplification delineated above, the upper blade bevel of 60° and the lower blade bevel of 45° offers an ideal arrangement with optimum shearing efficiency and wherein the totality of the included angle is in the order of 105°. Various changes in the angularization of the respective cutting edges could conceivably be made so long as the totality of the included angle is not less than 80° or not greater than 120°. For example, typical alternate arrangements could exploit angles of 40° and 50°, or 45° and 65°, etc. Each offers an excellent combination of retention means and positive cutting means and is well within the 80°-120° parameters.

The holding surface of one blade provides an effective retaining means for holding the work against movement along the longitudinal extent of the blades as their cutting edges are being brought together for the cutting action.

The embodiments of the invention in which an exclusive property or privilege is claimed are defined as follows:

1. A cutting device comprising in combination:
   a first elongate blade having a generally convex work-engaging-edge for engaging the work to be cut and an elongate handle portion,
   a second elongate blade having a generally convex work-engaging-edge for engaging the work to be cut and an elongate handle portion,
   a pivot means for pivotally linking together the first and second blades whereby the work-engaging edges of the blades oppose one another in facing relationship and in swinging in the closing stroke toward each other define an included angle,
   the defined included angle between the work-engaging edges of the blades at any point of their intersection from the initiation to the termination of the closing stroke being a constant value,
   the work-engaging-edges having bevels with the totality of the included angles of the edges being in the order of at least 80° and not in excess of 120°.

2. A cutting device comprising in combination:

a first elongate blade having a generally convex cutting edge for engaging the work to be cut and an associated elongate handle portion, a second elongate blade having a generally convex cutting edge for engaging the work to be cut and an associated elongate handle portion, a pivot means for pivotally linking together the first and second blades whereby the cutting edges of the blades oppose one another in facing relationship and in swinging in the closing stroke toward each other define an included angle, the defined included angle between the cutting edges of the blades at any point of their intersection from stroke initiation to stroke termination having a relatively constant value of 17±3°, the work-engaging-edges having bevels with the totality of the included angles of the edges being in the order of at least 80° and not in excess of 120°.

3. A cutting device comprising in combination:

a first elongate blade having a generally convex cutting edge for engaging the work to be cut and an associated elongate handle portion, a second elongate blade having a generally convex cutting edge for engaging the work to be cut and an associated elongate handle portion, a pivot means for pivotally linking together the first and second blades whereby the cutting edges of the blades oppose one another in facing relationship and in swinging in the closing stroke toward each other define an included angle, the defined included angle between the cutting edges of the blades at any point of their intersection from stroke initiation to stroke termination having a relatively constant value of 17°±3°, the cutting edges having corresponding tangent lines bisecting each other and being generally normal to an imaginary line subtending the pivot of the blades.

4. The cutting device of claim 3, the cutting edges of the blades having bevels with respect to the respective outer faces of the respective blades and defining a totality of the included angles being in the order of at least 80° and not in excess of 120°.

5. The cutting device of claim 3, the cutting edges of the blades having bevels with respect to the respective outer faces of the respective blades with the totality of the defined included angles of the bevels being in the order of between 80° and 120°.

6. A cutting device comprising in combination:

a first elongate blade having a generally convex work-engaging edge for engaging the work to be cut, a first elongate handle, a second elongate blade having a generally convex work-engaging-edge for engaging the work to be cut, a second elongate handle, a pivot means for allowing the movement of the blades in closing and opening strokes with the work-engaging edges opposing one another in facing relationship, each blade being connected to a respective one of the handles with movement of the handles in closing stroke toward and in opening stroke away from each other inducing corresponding movement of the blades about the pivotal connection such that the size of the subtended angle between the work-engaging edges is in the order of 17°±3°, the work-engaging edges having bevels with the totality of the included angles of the edges being in the order of at least 80° and not in excess of 120°.

7. A work cutting device comprising in combination:

a first elongate blade having a generally convex work-engaging-edge for engaging the work to be cut and a first elongate handle fixed thereto, a second elongate blade having a generally convex work-engaging-edge for engaging the work to be cut and a second elongate handle fixed thereto, the first and second blades and respective handles being pivotally interengaged with the work-engaging-edges opposing each other in facing relationship, a relatively constant included angle of a minimum of 14° and a maximum of 20°, the size of the subtended angle between the work-engaging edges is in the order of 17°±3°, the work-engaging-edges having bevels with the totality of the included angles of the edges being in the order of at least 80° and not in excess of 120°.

8. In the work cutting device of claim 7, the work-engaging-edges in the closing stroke defining an ever-narrowing opening having an ever-increasing included angle starting from at least 14° at the initiation of the closing stroke and ending at no more than 20° at the termination of the closing stroke.

9. In the work cutting device of claim 7, the defined included angle between the blades at any point of their intersection along the lengths of the blades having a value of between 14° and 20° between closing stroke initiation and termination.

* * * * *